(12) United States Patent
Maupu et al.

(10) Patent No.: US 9,541,979 B2
(45) Date of Patent: Jan. 10, 2017

(54) METHOD FOR DETERMINING AN OPTIMAL FREQUENCY FOR EXECUTION OF A SOFTWARE APPLICATION

(71) Applicant: Bull SAS, Les Clayes Sous Bois (FR)

(72) Inventors: Yann Maupu, Arpajon (FR); Thomas Cadeau, Massy (FR)

(73) Assignee: BULL SAS, Les Clayes Sous Bois (FR)

( * ) Notice: Subject to any disclaimer, the term of this patent is extended or adjusted under 35 U.S.C. 154(b) by 0 days.

(21) Appl. No.: 14/884,886

(22) Filed: Oct. 16, 2015

(65) Prior Publication Data

US 2016/0109919 A1 Apr. 21, 2016

(30) Foreign Application Priority Data

Oct. 16, 2014 (FR) ..................................... 14 59967

(51) Int. Cl.
*G06F 1/28* (2006.01)
*G06F 1/32* (2006.01)
(Continued)

(52) U.S. Cl.
CPC . *G06F 1/28* (2013.01); *G06F 1/32* (2013.01); *G06F 9/4881* (2013.01);
(Continued)

(58) Field of Classification Search
CPC ....... G06F 1/32; G06F 1/3203; G06F 11/3419
See application file for complete search history.

(56) References Cited

U.S. PATENT DOCUMENTS

2007/0168055 A1 7/2007 Hsu
2011/0271283 A1\* 11/2011 Bell, Jr. ................ G06F 9/5094
718/102
(Continued)

OTHER PUBLICATIONS

French Patent Application No. 1459967 Search Report Dated Jun. 17, 2015 (11 pages including English translation).
(Continued)

*Primary Examiner* — Albert Wang
(74) *Attorney, Agent, or Firm* — Brinks Gilson & Lione

(57) ABSTRACT

A method for determining an optimal frequency ($f_o$) for the execution of a software application on an information processing system. The method includes a first execution of said application at a predetermined frequency ($f_d$), making it possible to determine an overall execution time ($T_g$) and an overall energy consumption ($E_g$) and a second execution of said application at the same frequency by means of a measurement tool, making it possible to determine measurements ($T_{MPI}^*$, $T_{IO}^*$, $T_g^*$) on said execution; a step of determining a first law providing an execution time ($t(f)$) as a function of the frequency (f), and a second law providing an energy consumption ($E(f)$) as a function of the frequency (f); and a step of determining said optimal frequency ($f_o$) as the frequency optimizing a criterion ($C(f)$) combining said execution time and said energy consumption, as a function of the frequency.

10 Claims, 1 Drawing Sheet

(51) Int. Cl.
G06F 11/34 (2006.01)
G06Q 10/00 (2012.01)
G06F 9/48 (2006.01)
G06F 11/30 (2006.01)

(52) U.S. Cl.
CPC ...... *G06F 11/3409* (2013.01); *G06F 11/3419* (2013.01); *G06F 11/3447* (2013.01); *G06Q 10/00* (2013.01); *G06F 11/3003* (2013.01); *G06F 11/3062* (2013.01); *G06F 11/3428* (2013.01); *G06F 11/3466* (2013.01); *G06F 2201/865* (2013.01)

(56) References Cited

U.S. PATENT DOCUMENTS

2012/0260057 A1    10/2012  Eyerman
2013/0139170 A1*   5/2013   Prabhakar ............. G06F 9/4893
                                                         718/104

OTHER PUBLICATIONS

Article, Freeh et al., "Exploring the Energy-Time Tradeoff in MPI Programs on a Power- Scalable Cluster", Proceedings of the 19$^{th}$ International IEEE Parallel and Distributed Processing Symposium, Apr. 4, 2005, (10 pages) pp. 4a-4a, XP010785486, DOI: 10.1109/IPDPS.2005.214; ISBN: 978-0-7695-2312-5.

Article, Balaprakash et al., Advances in Communication Networking: 20$^{th}$ International Workshop, Rennes, France, Sep. 1-5, 2014, Revised Selected Papers; [Lecture Notes in Computer Science ISSN 1611-3349], Springer Verlag, DE, XP047300694, ISSN: 0302-9743.

* cited by examiner

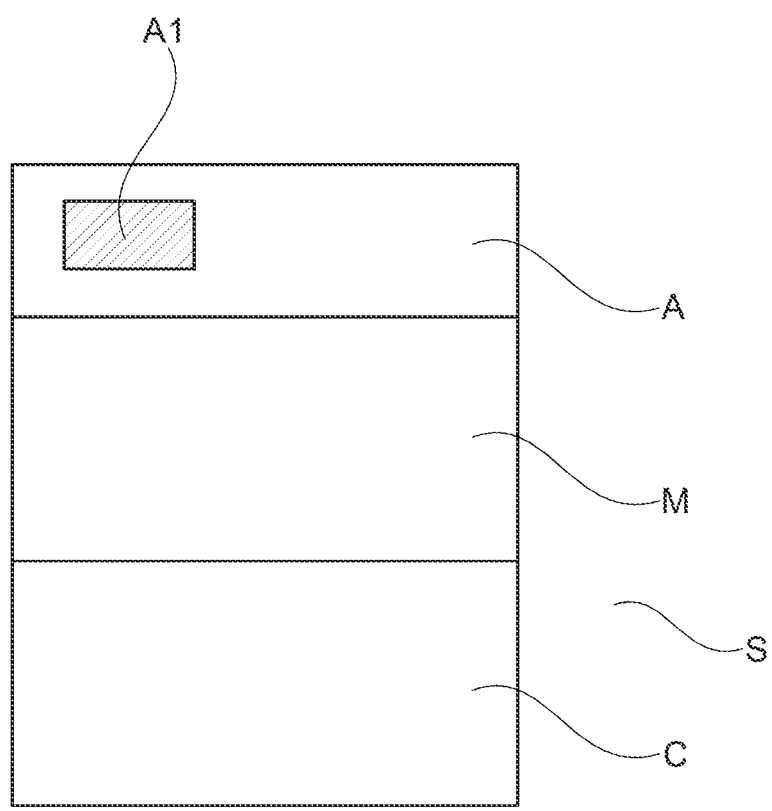

METHOD FOR DETERMINING AN OPTIMAL FREQUENCY FOR EXECUTION OF A SOFTWARE APPLICATION

This application claims priority to French Application No. 1459967 filed Oct. 16, 2014; the entire contents of which is incorporated herein by reference.

FIELD OF THE INVENTION

The invention relates to the execution of a software application on an information processing system. It relates more specifically to the determination of the optimal frequency of execution of the software application, for example, on a computer cluster.

CONTEXT OF THE INVENTION

Certain information processing devices make it possible to choose, when launching a software application, the frequency of the microprocessor(s) (or CPU for Central Processing Unit) at which it is to be executed.

The execution time of the application is dependent upon this choice: the higher the frequency is, the shorter the execution time will be.

However, the choice of the execution frequency also influences the energy consumption. In fact, the higher the frequency is, the higher the instantaneous energy consumption is (i.e. per quantum of time).

In general, the user of a software application seeks to minimize both the execution time and the energy consumption.

In the case of computer clusters, in particular on the "cloud", the users are billed according to access to computation services. The billing is typically based on the usage time, but also, increasingly, on the energy consumption, i.e. the electrical consumption used by the computer cluster to execute the client's software application.

For this reason as well, it is important for the user to be capable of minimizing these two criteria: execution time and energy consumption. However, they have proportionality ratios opposed with respect to the execution frequency. Increasing the frequency makes it possible to reduce the execution time of the application, but simultaneously increases the energy consumption: the determination of an optimal frequency, enabling the two criteria to be reconciled, therefore presents a problem.

A known solution involves executing test applications at different frequencies and measuring the execution time and the energy consumption.

However, such an approach is not satisfactory for a number of reasons.

It requires numerous executions, insofar as the number of possible frequencies may be relatively high. These numerous executions represent a cost in terms of both overall execution time (the execution time of the application is prolonged by these test executions) and energy consumption.

If the user is billed for access to the computer cluster, these numerous executions also represent a financial cost.

SUMMARY OF THE INVENTION

The objective of this invention is to provide a solution at least partially overcoming the aforementioned disadvantages.

To this end, this invention proposes a method for determining an optimal frequency for execution of a software application on an information processing system, comprising:

a first execution of said application at a predetermined frequency $f_o$, making it possible to determine an overall execution time and an overall energy consumption;

a second execution of said application at said predetermined frequency $f_d$, by means of a measurement tool, making it possible to determine measurements $T_{MPI}^*$, $T_{IO}^*$, $T_g^*$ on the execution of said application;

a step of determining a first law providing an execution time t(f) as a function of the frequency f, and a second law providing an energy consumption E(f) as a function of the frequency f;

a step of determining said optimal frequency $f_o$ as the frequency optimizing a criterion C(f) combining said execution time and said energy consumption, as a function of the frequency.

According to preferred embodiments, the invention includes one or more of the following features, which may be used separately or partially combined with one another or totally combined with one another:

said measurements T* include measurements $T_{IO}^*$ on the inputs-outputs of said software application.

said measurements T* include measurements $T_{MPI}^*$ on the calls to the management and communication system.

said calls are made via a message passing interface, MPI, in which the measurements on said calls include times relating to the functions MPI_Init, MPI_wait, MPI_Barrier.

said criterion has the form $C(f)=w_t \cdot t(f)+w_E \cdot E(f)$, in which $w_t$ and $w_E$ are two predetermined weights.

said optimal frequency $f_o$ is determined by calculating the values of said criterion C(f) for a plurality of frequency values and by searching for the minimum value of said criterion among the values calculated.

the value of said criterion C(f) is calculated for each possible value of said frequency f.

said first law is expressed in the form $$t(f) = \frac{a}{f} + T_\infty$$

in which $$T_\infty = \frac{T_g}{T_g^*} \cdot T^* \text{ and } a = f_d \cdot (T_g - T_\infty)$$

said second law is expressed in the form $$E(f)=p(f) \cdot t$$

in which p(f) represents the power of said information processing system as a function of the frequency.

said information processing system is a computer cluster.

Other features and advantages of the invention will appear upon reading the following description of a preferred embodiment of the invention, provided as an example and with reference to the appended drawings.

BRIEF DESCRIPTION OF THE DRAWINGS

FIG. 1 very schematically shows an information processing system, according to an embodiment of the invention.

DETAILED DESCRIPTION OF THE INVENTION

FIG. 1 shows, very schematically and at a high level, an information processing system S, typically comprising:
- a first hardware layer C formed by microprocessors and other computing circuits.
- a second software layer M formed by an operating system (OS) and optionally a "middleware" communication platform.
- a third layer A, also software, containing the applications A1.

These layers may represent an abstract view insofar as the information processing system may be distributed over a plurality of processing machines. This is in particular in the case of a computer cluster that interconnects a large number of computers, localized at one or more sites.

The intermediate layer makes it possible, among other functionalities, to render the hardware infrastructure transparent for the applications A1. It also makes it possible to ensure communications between applications and the interactions between the applications and the outside world, i.e. to manage the inputs-outputs.

The intermediate layer may include a management and communication system having, for example, a message passing interface or MPI. MPI is a standard based on the Unix operating system defining functions capable of being used by the software applications in order to exploit the functionalities of the multi-computer and/or multiprocessor processing platforms via a message passing mechanism.

The invention is intended to determine an optimal frequency $f_o$ as the frequency optimizing a criterion C(f) combining the execution time and the energy consumption, as a function of the execution frequency of the application A1. According to the invention, this optimal frequency is determined specifically for the application A1: as a function of the characteristics and the specific behavior of each application, a different optimal frequency $f_o$ may be determined.

According to the invention, in order to determine this optimal frequency $f_o$, the software application A1 is executed twice. Each of these executions makes it possible to determine a subset of parameters, the sharing of which enables said optimal frequency $f_o$ to be determined in a subsequent step.

A first execution is performed at a predetermined frequency $f_d$. It makes it possible to determine an overall execution time $T_g$ and an overall energy consumption $E_g$.

A second execution is performed at the same predetermined frequency $f_d$, but this time by means of a measurement tool, making it possible to determine measurements $T_{MPI}^*$, $T_{IO}^*$, $T_g^*$ on the execution of the application.

The order in which the two executions take place is unimportant. In addition, it is not important for the two executions to be performed in association: they may take place at different times, in particular according to the ordering imposed by the load of the information processing system. The value of the frequency $f_d$ is also unimportant, but it must be the same for the two executions.

The overall execution time $T_g$ and the overall electrical consumption $E_g$ may be determined by means of task ordering tools called "batch scheduler" or "job scheduler" tools.

These tools make it possible, among other functionalities, to link launchings of applications and, for some, to record in a log, information on said launchings, in particular the dates, any errors, and so on. An example of such a tool may be SLURM (for "Simple Linux Utility Resource Management").

The overall execution time $T_g$ is easily determined by comparing the starting date of execution of the software application A1 and the end date of execution. These dates may be obtained easily from the log of the ordering tool.

Similarly, the energy consumption $E_g$ may be determined by a tool by consulting the log. The energy consumption is typically expressed in joules and represents the energy consumed by the hardware resources used for the execution of the software application A1.

Different mechanisms may be implemented by the ordering tools in order to determine said energy consumption $E_g$. For example:
- A first implementation consists in using hardware counters accessible in read mode and placed in the microprocessors themselves. These counters may be of the RAPL type (for "Running Average Power Limit"), a mechanism available on the microprocessors of the Intel manufacturer.
- a second implementation consists in using probes observed by a remote administration controller on the motherboard and accessible via the IPMI protocol (for "Intelligent Platform Management Interface").

This IPMI interface makes it possible to manage an information processing system by using a network interface and without going through the operating system.

The measurement tool used for the second execution may be a code profiling tool.

The code profiling tool consists in analyzing the execution of a software program in order to know its behavior upon execution.

The code profiling makes it possible to check, during the execution of a software program:
- the list of functions called upon and the time passed between each of them;
- the processor use;
- the memory use.

The profiling of the code is implemented by instrumentation of the source code by adding instructions to the original source code that make it possible to measure the behavior of the software during execution. Then, a usage scenario is defined and executed on the instrumented software. The profiling data is collected and analyzed at the end of the execution.

As examples of profiling tools, it is possible to cite the BullxProf tool of the Bull company, the Allinea Map tool of the Allinea company, Gprof, which is a tool under GNU license, and so on.

Owing to this second execution, it is possible to determine measurements $T_{MPI}^*$, $T_{IO}^*$, $T_g^*$ on the execution of the software application, and more specifically
- An overall execution time by means of the software tool $T_g^*$. Because of the use of this tool, which is involved in the behavior of the software application, said time $T_g^*$ is necessarily longer than the overall execution time $T_g$ without the tool.
- A time $T_{IO}^*$ corresponding to the inputs-outputs of the software application. Each input-output (i.e. access to an external peripheral, to the mass storage, and so on)

involves a time lapse. The measured time $T_{IO}*$ corresponds to the accumulation of said time lapses over the entire execution time of the software application A time $T_{MPI}*$ on the calls to the management and communication system, in particular via an MPI interface. This is also a measurement corresponding to the accumulation of different time lapses spent in communication throughout the execution of the software application.

According to an embodiment of the invention, a selection is made among the different functions of the MPI interface. Series of experiments were performed in order to determine the subset of functions providing the optimal results.

According to this embodiment, the functions taken into account for the measurement of the time $T_{MPI}*$ are the functions MPI_Init, MPI_wait and MPI_Barrier.

The MPI_Init function initializes the execution environment of the MPI interface.

The MPI_Wait function waits for a request at the MPI interface to be terminated.

The MPI_Barrier function blocks the execution until all of the processes have reached this point.

The time $T_{MPI}*$ spent on the execution of these three functions forms a good estimation of the time spent for the calls to the management and communication system.

The method according to the invention can then implement a step of determining
- a first law providing an execution time t(f) of the application as a function of the frequency f,
- and a second law providing an energy consumption E(f) as a function of the frequency (f).

According to an implementation of the invention, this first law may be expressed in the form $$t(f) = \frac{a}{f} + T_\infty$$

in which $$T_\infty = \frac{T_g}{T_g^*} \cdot T^* \text{ and } a = f_d \cdot (T_g - T_\infty)$$

T* may represent the accumulation between the time $T_{IO}*$ associated with the inputs-outputs and the time $T_{MPI}*$ associated with the calls to the management and communication system:

$$T^* = T_{IO}^* + T_{MPI}^*$$

$T_\infty$ represents a "non-compressible" time of the software application, i.e. the theoretical execution time with an undefined frequency. It is a parameter specific to the behavior of the software application, like the parameter "a".

In order to completely determine this law, the two parameters "a" and $T_\infty$ must therefore be determined. These determinations may be made by the expressions $$T_\infty = \frac{T_g}{T_g^*} \cdot T^* \text{ and } a = f_d \cdot (T_g - T_\infty)$$

since all of the quantities $T_g$, $T_g*$, T* and $f_d$ are known at this stage.

The first relationship $$T_\infty = \frac{T_g}{T_g^*} \cdot T^*$$

assumes that the proportion of time T* associated with the inputs-outputs and communications with respect to the total execution time is the same with and without the profiling tool: this parameter $T_\infty$ can therefore be estimated on the basis of said accumulated time T*.

Once said parameter $T_\infty$ has been defined, the second parameter "a" may easily be deduced by the expression $a = f_d \cdot (T_g - T_\infty)$.

According to the invention, a second law providing the consumed energy E(f) is also determined as a function of the frequency f. According to an embodiment of the invention, this second law may be expressed in the form:

$$E(f) = p(f) \cdot t$$

in which p(f) represents the power of the information processing system as a function of the frequency.

The power p(f) may be determined on a preliminary basis for different values of the frequency.

For example, insofar as the number of possible frequencies may be limited, for example 8 different values, a preliminary step may be to launch the execution of a test application with each of these frequency values, and to measure the energy consumed E(f) and the execution time. It is then easy to deduce the power p(f) for each of said frequencies.

It is also possible, in particular if the number of possible values is higher, to perform this execution and these measurements only on a limited number of values, and to perform an interpolation for the intermediate values.

The test application must ideally be a software application performing few inputs-outputs and calls to the management and communication system, but making many calls to the microprocessor. Such a test application may, for example, be the "Unpack" performance test. This test is used in particular to classify the most powerful supercomputers in the world in the TOP500. Created by Jack Dongarra, it measures the time taken by a computer to solve a system of n equations with n dense unknowns, the solution being obtained by a partial use of Gaussian elimination, by $\frac{2}{3} \cdot n^3 + n^2$ floating point operations. The performance is then calculated by dividing the number of operations by the time taken, therefore in FLOPS.

Knowing the power of the information processing system p(f) for all of the values of the frequency f, it is then possible to determine the second law for determining the energy consumed E(f) by the software application as a function of the frequency f.

The invention then includes a step of determining the optimal frequency $f_o$ as the frequency optimizing a criterion C(f) combining the execution time and the energy consumption, as a function of the frequency. This execution time and energy consumption are obviously determined by the first and second laws, respectively.

According to an embodiment of the invention, this criterion has the form:

$$C(f) = w_t \cdot t(f) + w_E \cdot E(f),$$

in which $w_t$ and $w_E$ are two predetermined weights. The choice of these two weights may be provided by the user of the software application depending on which is preferred and also depending on the billing policy of the operator of the information processing system.

If the number of possible frequency values is not too high, it is possible to calculate the value of the criterion C(f) for each of the values of the frequency f, and to search for the minimum value of said criterion C(f) among said values. The optimal frequency $f_o$ is the frequency corresponding to said minimum value of the criterion C(f).

Of course, this invention is not limited to the examples and the embodiment described and shown, but can be used with numerous alternatives accessible to a person skilled in the art.

The invention claimed is:

1. A method for determining an optimal frequency ($f_o$) for the execution of a software application on an information processing system, comprising
  executing, for a first time, the application at a predetermined frequency ($f_d$) to determine an overall execution time ($T_g$) and an overall energy consumption ($E_g$);
  executing, for a second time, the application at the predetermined frequency ($f_d$), by means of a measurement tool, to determine measurements that include at least one of an overall execution time ($T_g^*$), a time corresponding to the inputs-outputs of the software application ($T_{IO}^*$), and a time one calls to a management and communication system ($T_{MPI}^*$) measurements on the execution of the application;
  determining a first law providing an execution time (t(f)) as a function of the frequency (f), and a second law providing an energy consumption (E(f)) as a function of the frequency (f); and
  determining the optimal frequency ($f_o$) as a frequency optimizing a criterion (C(f)) combining the execution time and the energy consumption, as a function of the frequency.

2. The method according to claim 1, wherein the measurements (T*) include measurements ($T_{IO}^*$) on the inputs-outputs of the software application.

3. The method according to claim 2, wherein the measurements (T*) include measurements ($T_{MOI}^*$) on the calls to the management and communication system.

4. The method according to claim 3, wherein the calls are made via a message passing interface, MPI, and wherein the measurements on the calls include times relating to functions MPI_Init, MPI_wait, MPI_Barrier.

5. The method according to claim 4, wherein the criterion is in a form C(f)=$w_t$·t(f)+$w_E$·E(f), wherein $w_t$ and $W_E$ are two predetermined weights.

6. The method according to claim 5, wherein the optimal frequency ($f_o$) is determined by calculating the values of the criterion (C(f)) for a plurality of frequency values and by searching for the minimum value of the criterion among the values calculated.

7. The method according to claim 6, wherein the value of the criterion C(f) is calculated for each possible value of the frequency (f).

8. The method according to claim 7, wherein the first law is expressed in the form $$t(f) = \frac{a}{f} + T_\infty$$

wherein $$T_\infty = \frac{T_g}{T_g^*} \cdot T^* \text{ and } a = f_d \cdot (T_g - T_\infty)$$

9. The method according to claim 8, wherein the second law is expressed in the form $$E(f)=p(f)\cdot t$$

wherein p(f) represents the power of the information processing system as a function of the frequency.

10. The method according to claim 9, wherein the information processing system is a computer cluster.

* * * * *